Aug. 10, 1926.　　　　　1,595,075
E. E. CULBERTSON
UNIVERSAL JOINT
Original Filed May 24, 1920　　2 Sheets-Sheet 1
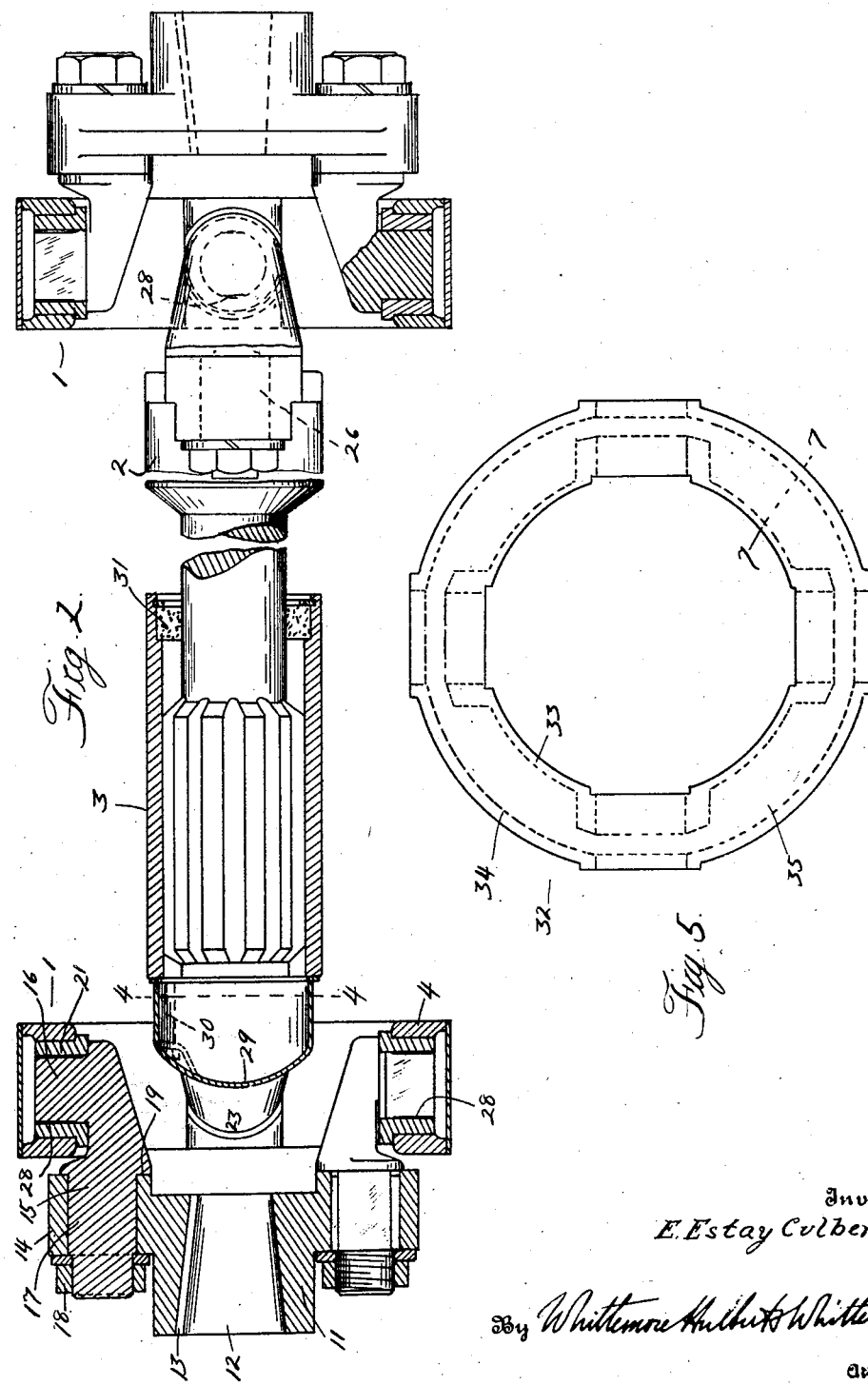
Inventor
E. Estay Culbertson
By Whittemore Hulbert & Whittemore.
Attorneys

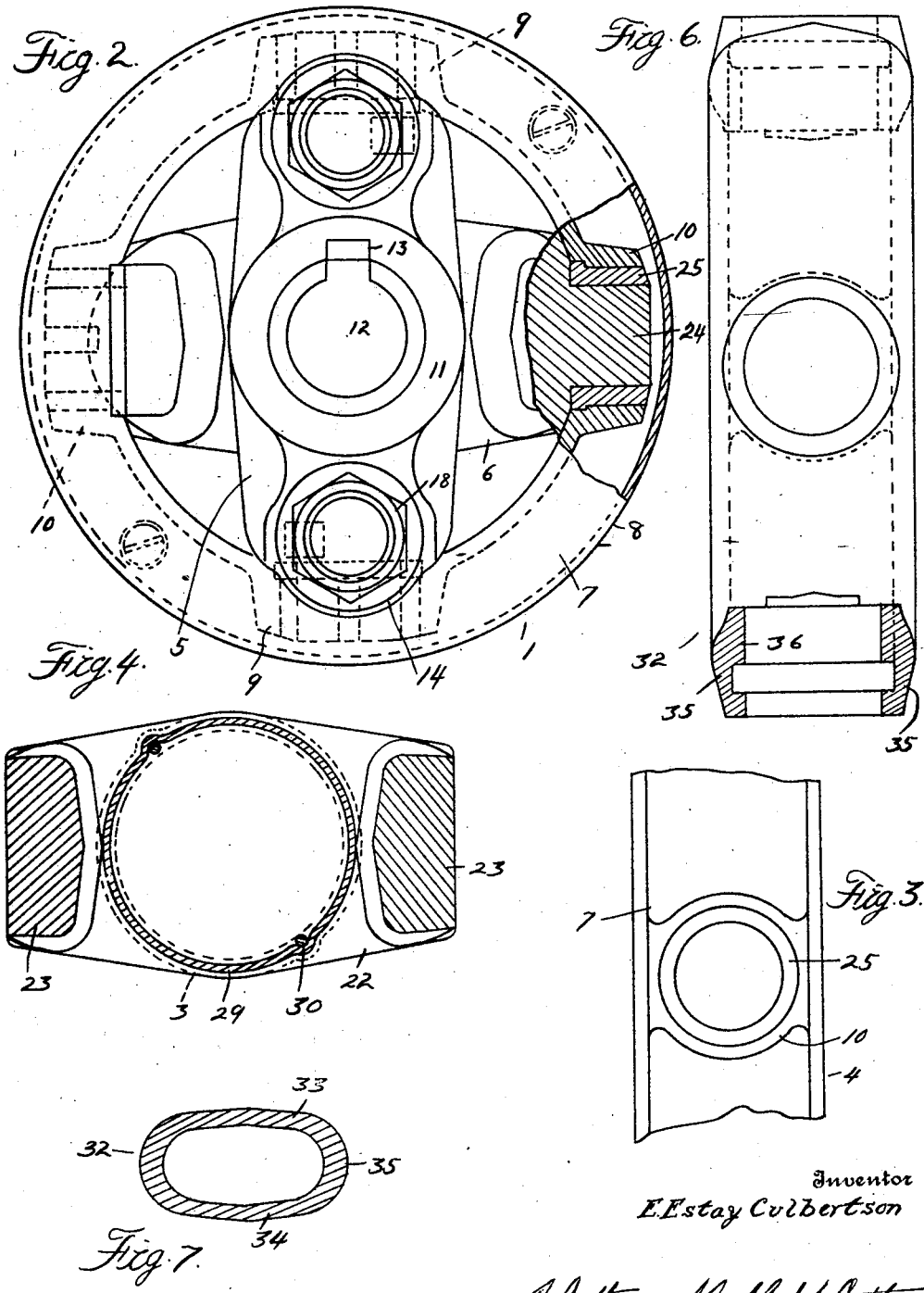

Patented Aug. 10, 1926.

1,595,075

UNITED STATES PATENT OFFICE.

E. ESTAY CULBERTSON, OF DETROIT, MICHIGAN.

UNIVERSAL JOINT.

Application filed May 24, 1920, Serial No. 383,611. Renewed April 26, 1926.

The invention relates to universal joints and has for one of its objects, the provision of a simple construction which is highly efficient in operation and the bearings of which are thoroughly lubricated.

Another object is to provide pivot members which are interchangeable. Other objects of the invention reside in the novel construction and the arrangement of parts as more fully hereinafter set forth.

In the drawings:

Figure 1 is a sectional elevation of a universal joint assembly embodying my invention;

Figure 2 is a sectional end view thereof;

Figure 3 is a side elevation of a portion of the hollow annulus with its peripheral cover removed;

Figure 4 is a cross section on the line 4—4 of Figure 1;

Figure 5 is a side elevation of a modified construction of hollow annulus;

Figure 6 is a sectional end elevation thereof;

Figure 7 is a cross-section on the line 7—7 of Figure 5;

The universal joint assembly comprises the duplicate universal joints 1 connected by the shaft 2 and sleeve 3, which have a longitudinally slidable splined engagement with each other.

The universal joint 1 comprises the hollow annulus 4 and the yokes 5 and 6 pivotally secured to the annulus with the axes of their pivots at right angles to each other. The hollow annulus is formed of a radially outwardly opening channel member 7 and the peripheral cover 8 at the outer ends of the flanges of the channel member. This peripheral cover is suitably secured to the channel member as by being welded thereto, whereby the annulus will be lubricant tight. The annulus has the pairs of annular flanges 9 and 10 extending radially outward from the base of the channel member 7, the axes of these pairs of annular flanges being at right angles to each other. The outer ends of these annular flanges are spaced from the peripheral cover 8 so as to permit of the lubricant in the annulus 4 passing completely around therewithin.

The yoke 5 comprises the hub 11 which is provided with the axial bore 12 and keyway 13 for non-rotatably receiving either a driving or driven shaft and also the pivots or pins 15. The hub 11 has the flanges 14 at opposite sides thereof, to each of which is secured a pivot or pin 15 having the journal 16 engageable in one of the annular flanges 9 of the annulus 4. Each pivot or pin has a shank 17 which passes through a flange 14 and is clamped thereto, by means of a nut 18 threadedly engaging the outer end of the shank and pulling the annular shoulder 19 upon the pivot or pin against the inner side of the flange. The pivots or pins are prevented from rotating in the flanges preferably by forming the shanks 17 of polygonal cross section and making the apertures in the flanges of similar shape. 21 are bushings engaging in the annular flanges 9 and in turn engaged by the journals 16 of the pivots or pins.

The yoke 6 comprises the arms 22 upon the outer end of the sleeve 3 and also the pivots or pins 23 non-rotatably secured to the arms which pivots or pins are the same as the pivots or pins 15. The journals 24 of these pivots or pins 23 rotatably engage in the bushings 25 within the annular flanges 10 while the stems 26 of these pivots or pins are clamped in the arms 22 and at opposite sides of the sleeve 3 and are also of polygonal cross section.

For the purpose of providing for more thorough lubrication of the journals 16 and 24, these journals are provided at opposite sides with flat faces 28, which extend inwardly from the outer ends of the bearings, but terminate short of their inner ends. These flat faces provide small recesses between the bushings and journals which will be filled with the lubricant so that upon relative rotation of the bearings in the bushings, the surfaces thereof will be lubricated.

In order to more thoroughly lubricate the splines between the shaft 2 and sleeve 3 and at the same time to prevent dust, dirt, etc. coming into contact therewith, the outer end of the sleeve 3 is provided with the cap 29 suitably secured thereto, as by means of the cap screws 30 which threadedly engage the sleeve. This cap is imperforate and is adapted to contain lubricant so that upon sliding movement of the shaft 2 toward the outer end of the sleeve 3 the lubricant will be displaced and forced between the sliding surfaces of the shaft and sleeve. Packing 31 is provided at the inner end of the sleeve 3 and surrounding an annular part of the shaft 2, whereby the lubricant is prevented from escaping and dust, dirt, etc. is prevented from entering.

Since the opposite end of the shaft 2 does not have any longitudinally slidable engagement, there is no cap at this end.

As shown in Figures 5, 6, and 7, the hollow annulus 32 is a casting having integral inner and outer peripheral walls 33 and 34 respectively connected by integral side walls 35. Integral annular flanges 36 are formed projecting radially outward from the inner peripheral wall 33, the axes of these flanges being at right angles to each other. These flanges are adapted to non-rotatably receive the bushings in which the journals of the pivots or pins rotate. For the purpose of more readily machining the faces of the annular flanges, registering apertures are provided in the outer peripheral wall 34, which may be suitably closed as by caps when the joint is assembled.

In view of the above description it will be readily seen that I have provided a construction of universal joint which is simple and has interchangeable pivots. Furthermore, the journals of the pivots are thoroughly lubricated, since they engage in a hollow annulus containing the lubricant and moreover are provided with flat faces. Since the journals of the pivots enter the hollow annulus from its inner periphery and since the hollow annulus is lubricant tight there is no tendency of the lubricant to escape from the annulus due to centrifugal force. Another important point is the provision of an imperforate cap at the end of the sleeve having a longitudinal slidable splined engagement with a shaft.

What I claim as my invention is:

1. The combination of a hollow annulus having inner and outer peripheral and side walls of integral construction, including integral annular flanges forming bearing seats extending radially outward from said inner peripheral wall and terminating short of the outer wall to provide a complete and continuous circular passageway through said annulus, cooperating compositely constructed yokes, each comprising a shaft member and a pair of interchangeable gudgeon members detachably and non-rotatably secured to each of said shaft members, each of said pair of gudgeon members having a transversely outwardly extending gudgeon, the operating center line of which is common to the other and perpendicular to the axis of said shaft member, said gudgeons being rotatably seatable in the annular flanges for swivelably mounting said composite yokes, said gudgeons being cut away to provide an annularly extending lubricant supply channel in the bearing, and means for non-rotatably securing said detachable gudgeon members to said shaft members.

2. A universal joint construction comprising a hollow annulus having inner and outer peripheral and side walls of integral construction, said annulus having two pairs of integral annular flanges positioned diametrically in the inner wall and extending outwardly therefrom and terminating short of the outer wall thereof to provide a channel therethrough, said axes of said pairs of annular flanges being at right angles to each other, a friction reducing bearing in each of said annular flanges, two composite yoke members, each including a flanged member, a pair of detachable and interchangeable gudgeon members non-rotatably and rigidly secured to each of said flanged members in parallel relation thereto, each gudgeon member having a radially and outwardly extending gudgeon seatable in said bearings, said gudgeon and bearing having a channel therebetween extending inwardly from the outer end of the gudgeon and terminating short of the same for lubricating said friction reducing bearing surfaces, the gudgeons of each yoke having a common axis transversely of the yoke axis for swivelably mounting each of said yokes in said annulus on axes transversely of each other.

3. The combination of a hollow annulus having inner and outer peripheral and side walls of integral construction, including integral annular flanges forming bearing seats extending radially outward from said inner peripheral wall and terminating short of the outer wall to provide a complete and continuous circular passageway through said annulus, cooperating compositely constructed yokes, each comprising a shaft member and a pair of interchangeable gudgeon members detachably and non-rotatably secured to each of said shaft members, each of said pair of gudgeon members having a transversely outwardly extending gudgeon, the operating center line of which is common to the other and perpendicular to the axis of said shaft member, said gudgeons being rotatably seatable in the annular flanges for swivelably mounting said composite yokes, and means for non-rotatably securing said detachable gudgeon members to said shaft members.

4. A universal joint construction comprising a hollow annulus having inner and outer peripheral and side walls of integral construction, said annulus having two pairs of integral annular flanges positioned diametrically in the inner wall and extending outwardly therefrom and terminating short of the outer wall thereof to provide a channel therethrough, said axes of said pairs of annular flanges being at right angles to each other, a friction reducing bearing in each of said annular flanges, two composite yoke members, each including a flanged member, a pair of detachable and interchangeable gudgeon members non-rotatably and rigidly secured to each of said flanged members in parallel relation thereto, each gudgeon member having a radially and outwardly extending gudgeon seatable in said bearings, the gudgeons of each yoke having a common axis transversely of the yoke axis for swivelably mounting each of said yokes in said annulus on axes transversely of each other.

5. The combination of a hollow annulus having inner and outer peripheral and side walls of integral construction including integral flanges forming bearing seats extending radially outward from said inner peripheral wall and terminating short of the outer wall to provide a complete and continuous circular passageway through said annulus and co-operating yokes each comprising a shaft member and means non-rotatably secured to each of said shaft members forming outwardly extending gudgeons with common operating center lines perpendicular to the axes of their respective shaft members, said gudgeons being rotatably seatable in the flanges for swivelably mounting said yokes.

6. A universal joint construction comprising a hollow annulus having inner and outer peripheral and side walls of an integral construction, said annulus having two pairs of integral flanges positioned diametrically on the inner wall and extending outwardly therefrom and terminating short of the outer wall thereof to provide a channel therethrough, the axes of said pairs of flanges being at right angles to each other, a bearing in each of said flanges and two yoke members each including a shaft member, means non-rotatably and rigidly secured to each of said shaft members forming radially and outwardly extending gudgeons seatable in said bearings, the gudgeons of each yoke having a common axis transversely of the yoke axis for swivelably mounting each of said yokes in said annulus on axes transversely of each other.

7. The combination of a hollow annulus having inner and outer peripheral and side walls of integral construction, means forming bearing seats located between and secured to one of said walls, said bearing seats terminating short of the outer wall to provide a complete and continuous circular passageway through said annulus and cooperating shaft members each having at one end means forming outwardly extending gudgeons with common operating center lines perpendicular to the axes of the respective shaft member, said gudgeons rotatably engaging the bearing seats for swivelably mounting said shaft members.

In testimony whereof I affix my signature.

E. ESTAY CULBERTSON.